United States Patent
Tanaka

(10) Patent No.: US 8,405,739 B2
(45) Date of Patent: Mar. 26, 2013

(54) IMAGING SYSTEM AND PIXEL SIGNAL READOUT METHOD

(75) Inventor: Hiroyuki Tanaka, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 19 days.

(21) Appl. No.: 13/226,738

(22) Filed: Sep. 7, 2011

(65) Prior Publication Data

US 2012/0057046 A1    Mar. 8, 2012

(30) Foreign Application Priority Data

Sep. 8, 2010 (JP) ................................ 2010-200990

(51) Int. Cl.
- *H04N 5/235* (2006.01)
- *H04N 9/73* (2006.01)
- *H04N 3/14* (2006.01)
- *G06K 9/40* (2006.01)

(52) U.S. Cl. ............... 348/229.1; 348/226.1; 348/221.1; 348/296; 382/274

(58) Field of Classification Search ............... 348/226.1, 348/229.1, 221.1, 362, 296, 367, 195; 382/274
See application file for complete search history.

(56) References Cited

U.S. PATENT DOCUMENTS

| | | | |
|---|---|---|---|
| 2003/0107664 A1* | 6/2003 | Suzuki | 348/296 |
| 2009/0015707 A1* | 1/2009 | Hibino et al. | 348/347 |
| 2010/0177214 A1* | 7/2010 | Ozaki et al. | 348/234 |
| 2010/0177236 A1* | 7/2010 | Suzuki et al. | 348/349 |

FOREIGN PATENT DOCUMENTS

JP    2004-242010 A    8/2004

OTHER PUBLICATIONS

U.S. Appl. No. 13/156,611 to Yoshitaka Kimura et al., filed Jun. 9, 2011.
U.S. Appl. No. 13/226,729 to Hiroyuki Tanaka et al., filed Sep. 7, 2011.
U.S. Appl. No. 13/226,719 to Hiroyuki Tanaka et al., filed Sep. 7, 2011.
U.S. Appl. No. 13/226,703 to Hiroyuki Tanaka et al., filed Sep. 7, 2011.

* cited by examiner

*Primary Examiner* — Nhan T Tran
*Assistant Examiner* — Marly Camargo
(74) *Attorney, Agent, or Firm* — Greenblum & Bernstein P.L.C.

(57) ABSTRACT

An imaging system including a frame rate setter and an exposure evaluator. The frame rate setter sets a frame rate used in a focusing operation. The frame rate is set faster than a normal frame rate. The exposure evaluator evaluates the exposure of a focusing image based on pixel signals read out from a focusing image area at the frame rate. The frame rate is reduced when the exposure is evaluated as an underexposure and the focusing operation is carried out at a reduced frame rate.

4 Claims, 9 Drawing Sheets

IMAGING SYSTEM AND PIXEL SIGNAL READOUT METHOD

BACKGROUND OF THE INVENTION

1. Field of the Invention

The present invention relates to a device for reading out image signals from a CMOS image sensor and a method thereof.

2. Description of the Related Art

A contrast-detect autofocus (AF) function has been employed by various types of digital cameras where, in general, a focusing image is temporarily displayed on a monitor of the camera for a photographer to check whether or not the image is adequately in focus. However, the size of the monitor provided on the camera is usually not sufficient for a photographer to verify the quality or conditions of the focusing image when the entire image is represented on the display. In order to overcome such problems, a camera disclosed in KOKAI 2004-242010 enlarges an area with the highest degree of focusing and further indicates a subarea within the enlarged image having the highest focusing degree by framing the subarea.

SUMMARY OF THE INVENTION

Although a high-speed autofocus operation is preferable, the conventional contrast-detect autofocus technology is at a disadvantage when carrying out high-speed focusing because it must read out all signals within an actual pixel area (an area within an effective pixel area in which the quality of an image is guaranteed).

Accordingly, one aspect of the present invention is to accelerate the contrast-detect autofocus operation while enabling an indication of a focus-verification image with high visibility.

According to an aspect of the present invention, an imaging system is provided that includes a frame rate setter and an exposure evaluator. The frame rate setter sets a frame rate used in a focusing operation. The frame rate is set faster than a normal frame rate. The exposure evaluator evaluates an exposure of a focusing image based on pixel signals from a focusing image area that are read out at the frame rate. The frame rate is reduced when the exposure is evaluated as an underexposure, and the focusing operation is then carried out at a reduced frame rate.

According to another aspect of the present invention, a pixel signal readout method is provided that includes setting a frame rate used in a focusing operation and evaluating an exposure of a focusing image based on pixel signals from a focusing image area that are readout at said frame rate. The frame rate, which is set faster than a normal frame rate, is reduced when the exposure is evaluated as an underexposure so that the pixel signals are read out at a reduced frame rate.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
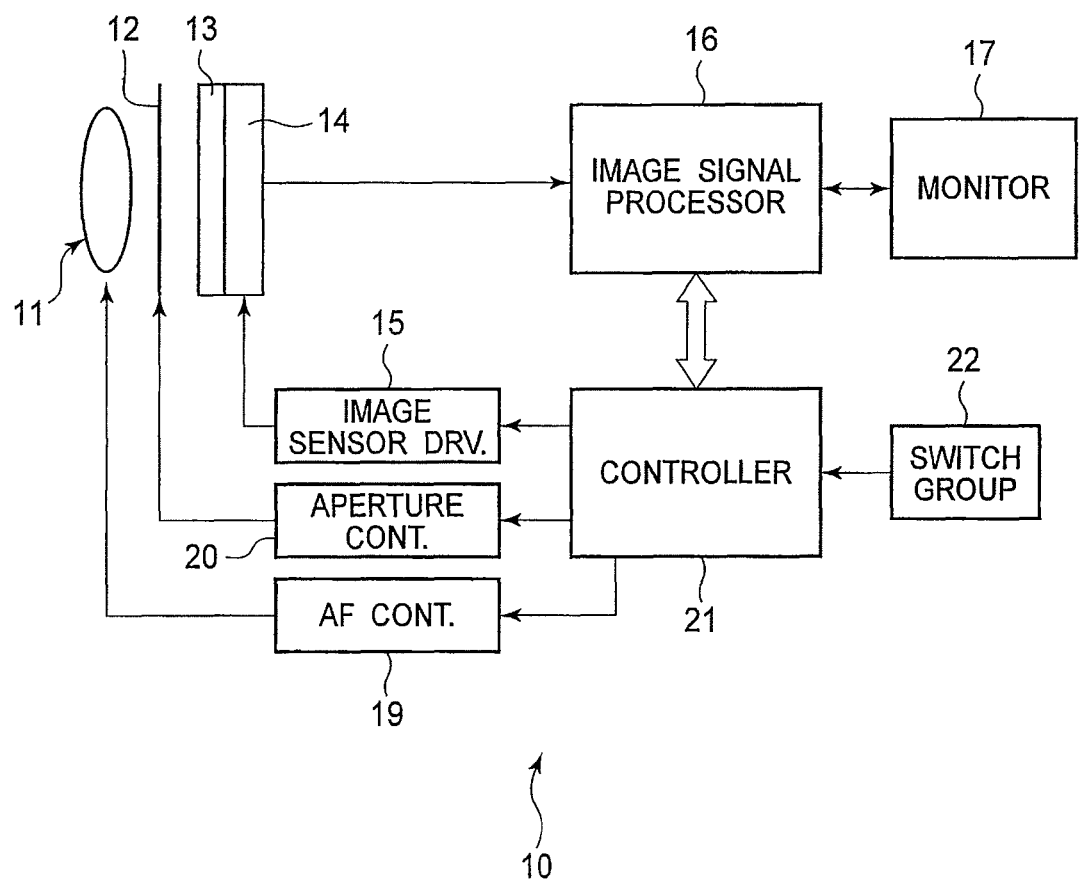
FIG. 1 is a block diagram schematically illustrating the general structure of a digital camera of an embodiment of the present invention.

The present invention is described below with reference to the embodiments shown in the drawings.

FIG. 1 is a block diagram schematically illustrating the general structure of a digital camera to which an embodiment of the present invention is applied.

The digital camera 10 may be a digital single-lens reflex camera. Light made incident to a lens system 11 forms an image on an imaging surface of a CMOS image sensor 14, for example, through an aperture 12 and a color filter array 13. The CMOS image sensor 14 may be controlled by drive signals from an image sensor driver 15. Image signals obtained by the CMOS image sensor 14 may be fed to an image signal processor 16 to be subjected to various types of image signal processing that are well known in the art, and in turn, the image may be displayed on a monitor 17.

An AF controller 19 may control the positions of the lenses in the lens system 11 to carry out the autofocus operation. Further, an aperture controller 20 may control the size of the aperture 12. Note that the image sensor driver 15, the AF controller 19 and the aperture controller 20 are controlled by instructions from a controller 21, and the controller 21 may perform various types of processes, including the autofocus operation (detailed later), based on the manipulation of switches in a switch group 22. The switch group 22 may include a release switch, AF button, dial switches, a touch panel, etc.

With references to FIGS. 2-5, the relationships between a readout area (CAF area), a frame rate, and exposure time in the contrast-detect autofocus (CAF) operation of the present embodiment will be explained.

Figure 2:
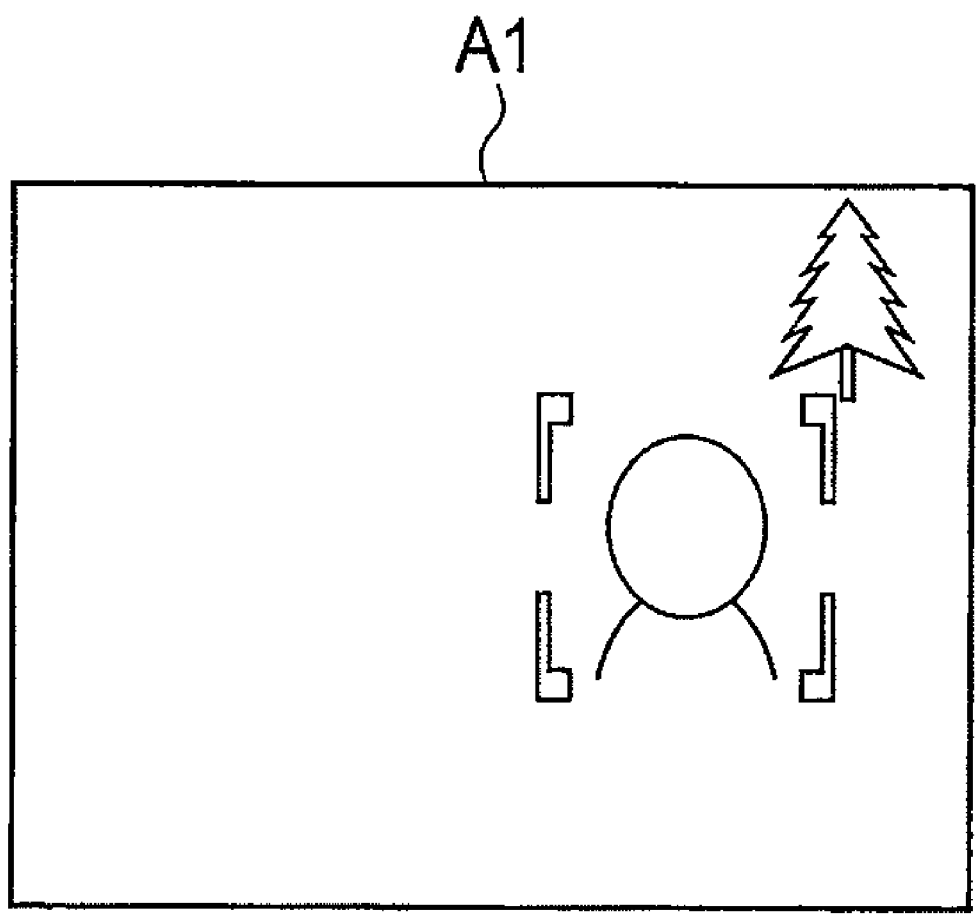
FIG. 2 illustrates a relationship between an actual pixel area (an effective pixel area) of a CMOS image sensor and a focus point.

FIG. 2 illustrates an area A1 that corresponds to an actual pixel area (or an effective pixel area) of the CMOS image sensor 14. A focus point is indicated by an area of which its four corners are designated by four brackets. In the present embodiment, in order to accelerate the CAF operations only a sub-area of the actual pixel area (or the effective pixel area) A1, with the focus point at its center, is used as the CAF area. Namely, the CAF operations are accelerated by increasing the frame rate by reading out only pixel signals from within the sub-area or the CAF area.

Figure 3:
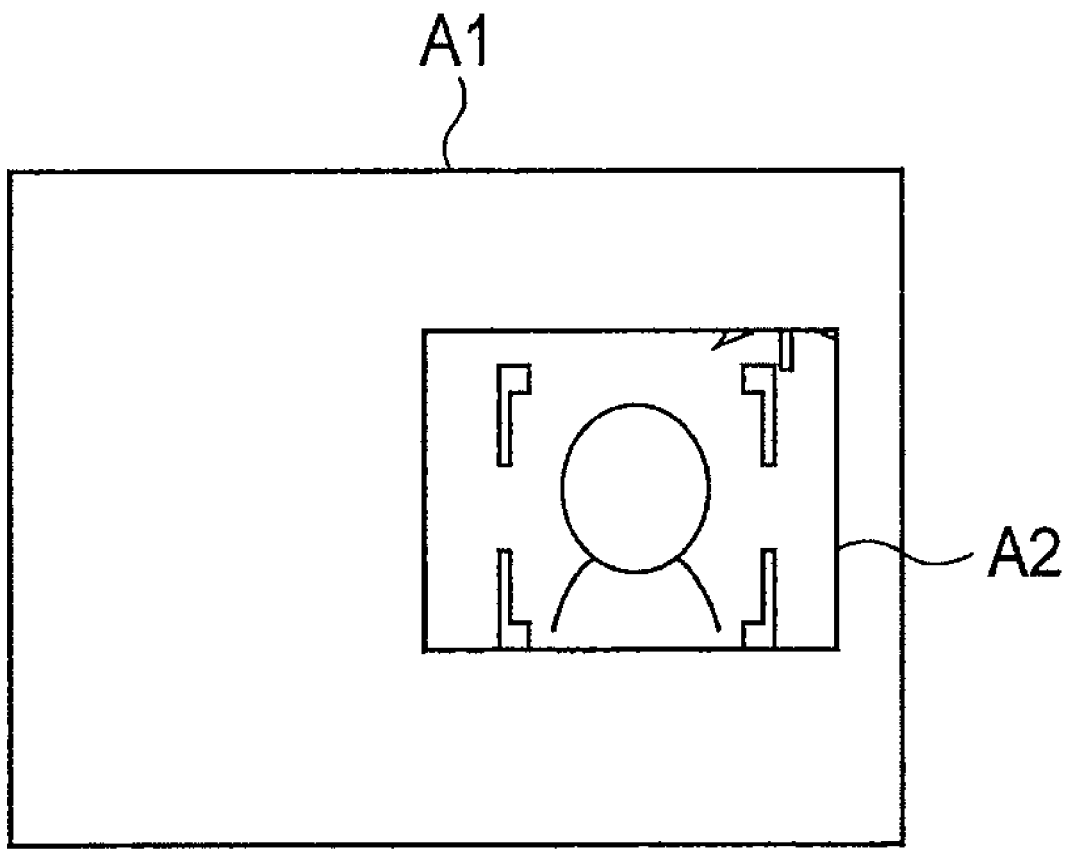
FIG. 3 shows an example of a CAF area defined under a high-speed frame rate.
Figure 4:
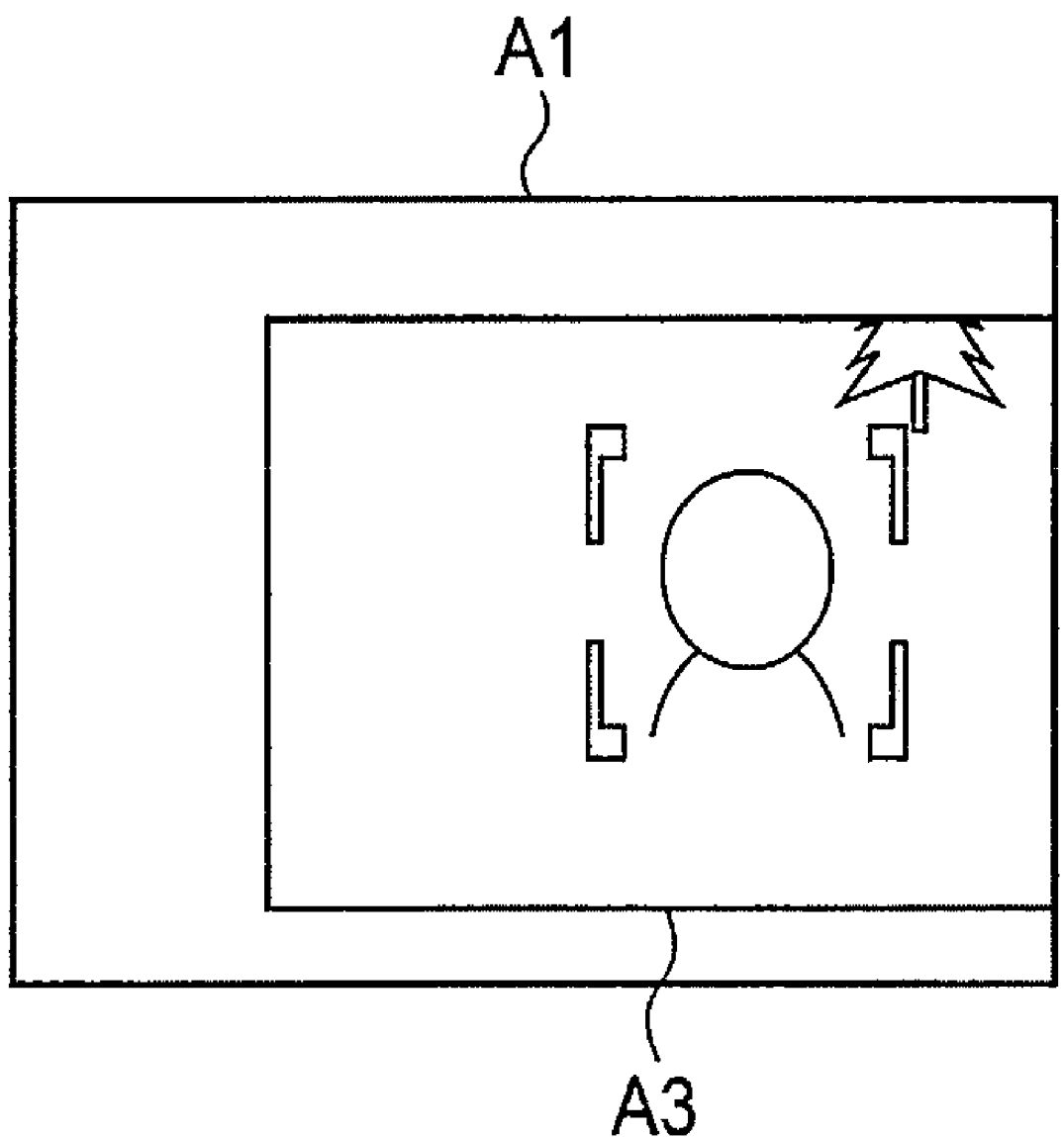
FIG. 4 shows an example of the CAF area defined under a reduced frame rate when an object is dark.
Figure 5:
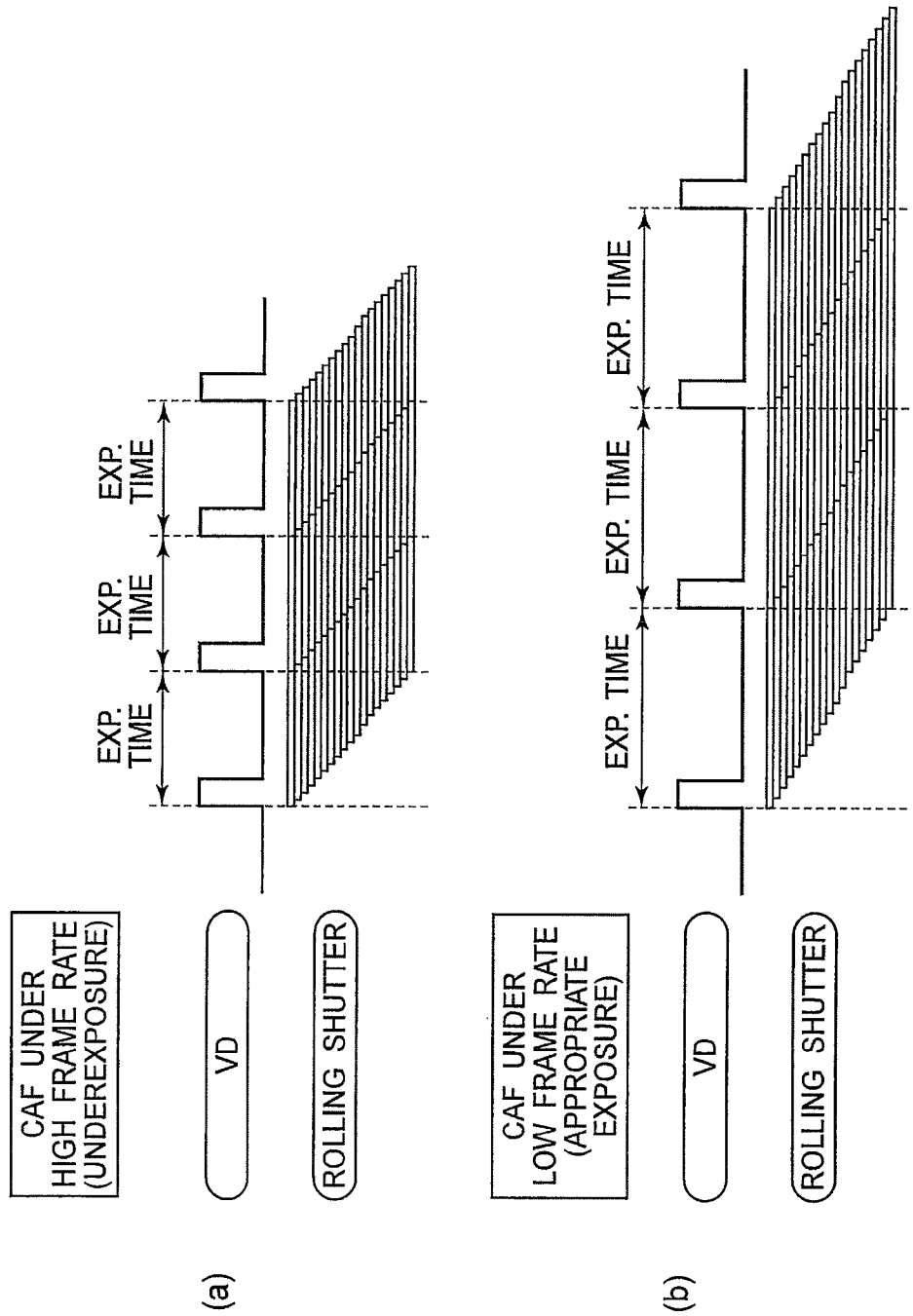
FIG. 5 is a timing chart showing the relationship between vertical synchronizing signals, the timing of a rolling shutter, and the exposure time in the CAF operations using the CAF areas illustrated in FIGS. 3 and 4.

An area A2 in FIG. 3 is an example of the CAF area defined with the focus point of FIG. 2 at its center. A time sequence of the readout operations of the pixel signals from the CMOS image sensor 14 when the area A2 is selected as the CAF area is illustrated in FIG. 5(a). Namely, in FIG. 5(a) a relationship between vertical synchronizing signals VD, the timing of a rolling shutter and exposure time is shown with the abscissa representing the time axis.

The frame rate determines the period of the vertical synchronizing signals and the maximum number of pixels allowed within the CAF area. When selecting a small CAF area to increase the frame rate for high-speed CAF operations, the period of the vertical synchronizing signals VD decreases. On the other hand, as shown in FIG. 5(a), the period of the vertical synchronizing signals VD corresponds to the maximum length of the exposure time, thus the maximum length of the exposure time decreases as the frame rate increases. Therefore, when an object is dark a focusing image obtained by the high-speed CAF operation may be underexposed, which makes it difficult for a user to verify the focusing degree from the focusing image displayed on the monitor 17 (see FIG. 1) because the underexposed focus-verification image, which may correspond to the area A2 of FIG. 3, may not be bright enough for the user to verify the focusing degree.

Accordingly, in the present embodiment the frame rate is decelerated when the brightness of an object within the CAF area is determined to be insufficient and, in turn, the CAF area is extended. For example, the area A2 of FIG. 3, which was selected as the CAF area, is replaced by an area A3 of FIG. 4. A time sequence of the readout operations of the pixel signals from the CMOS image sensor 14 when the area A3 is selected as the CAF area is illustrated in FIG. 5(b). Due to the reduced frame rate, the period of the vertical synchronizing signals VD and the exposure time are elongated in FIG. 5(b) compared to those in FIG. 5(a). Thereby, when an object is dark its image is obtained under appropriate exposure conditions by applying the area A3 of FIG. 4. Further, the user can easily verify the focusing degree by displaying a focusing image of the area A3 on the monitor 17 (see FIG. 1).

Figure 6:
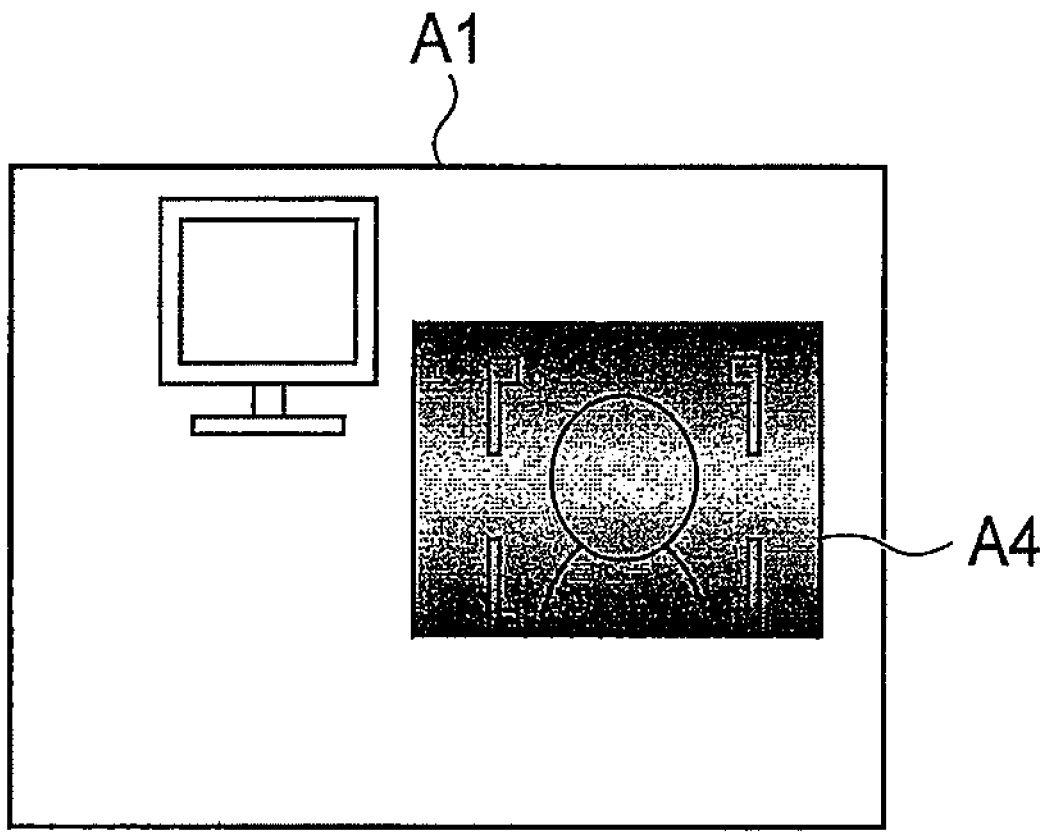
FIG. 6 illustrates an example of the CAF area corresponding to a frame rate affected by flickering ambient light.
Figure 8:
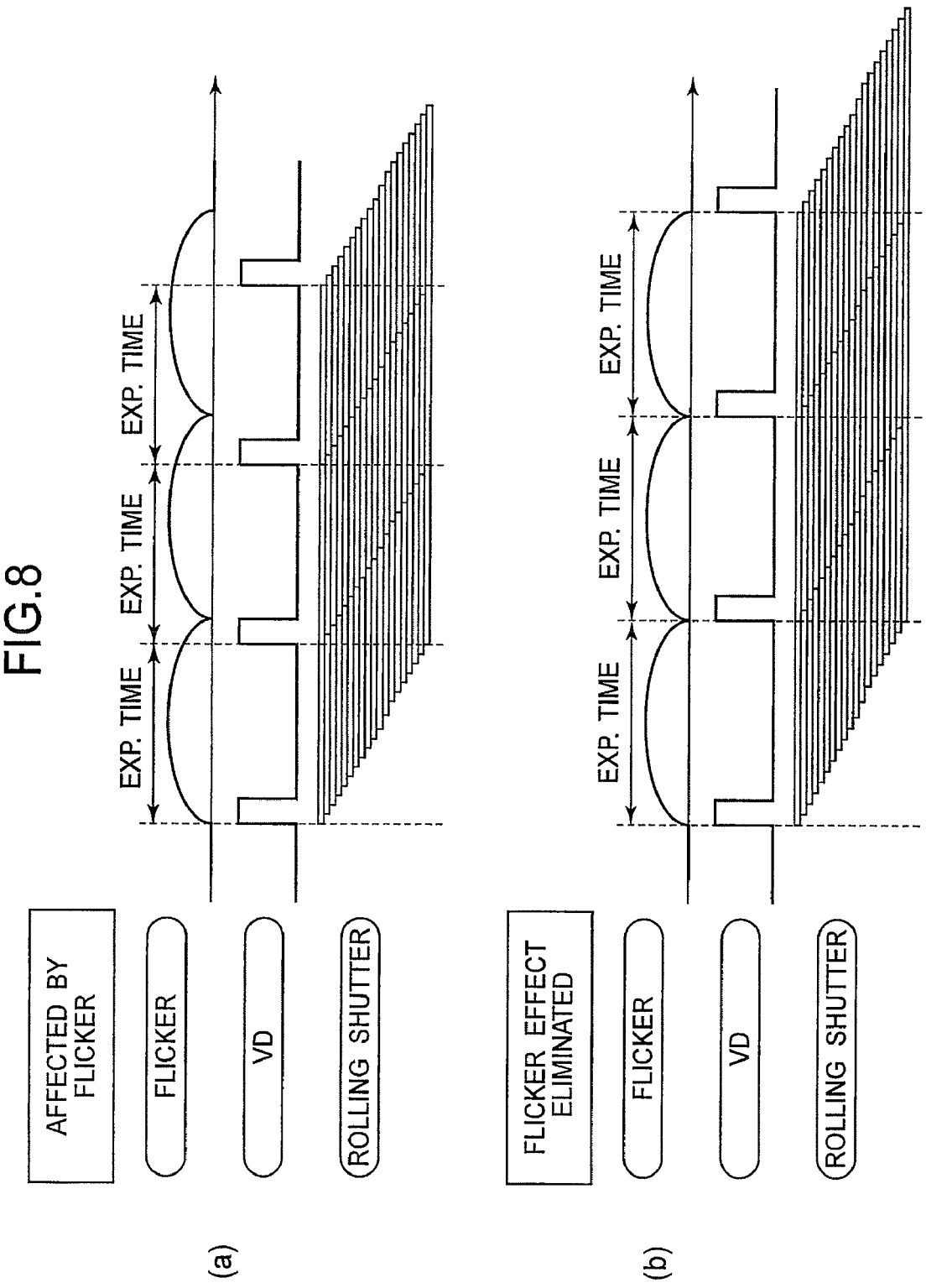
FIG. 8 is a timing chart showing the relationship between the vertical synchronizing signals, the timing of the rolling shutter, and the exposure time in the CAF operations using the CAF areas illustrated in FIGS. 6 and 7.

Further, when the pixel signals are read out at a high-speed frame rate flicker may occur in certain situations, as described below. For example, when the pixel signals are read out at a high-speed frame rate under flickering ambient light, such as a fluorescent light or the like, the amount of exposure for each pixel under the rolling shutter may be affected by the flickering of the light when the period of the vertical synchronizing signals VD is shorter than the flicker period of the light. Therefore, as illustrated in FIG. 6, an image within an area A4, which is set as the CAF area, will have uneven brightness. Note that the relationship between the time variation of brightness (the flickering) of the ambient light, the vertical synchronizing signals VD, and the timing of the rolling shutter is illustrated in the timing chart of FIG. 8(a), with the abscissa representing the time axis.

Figure 7:
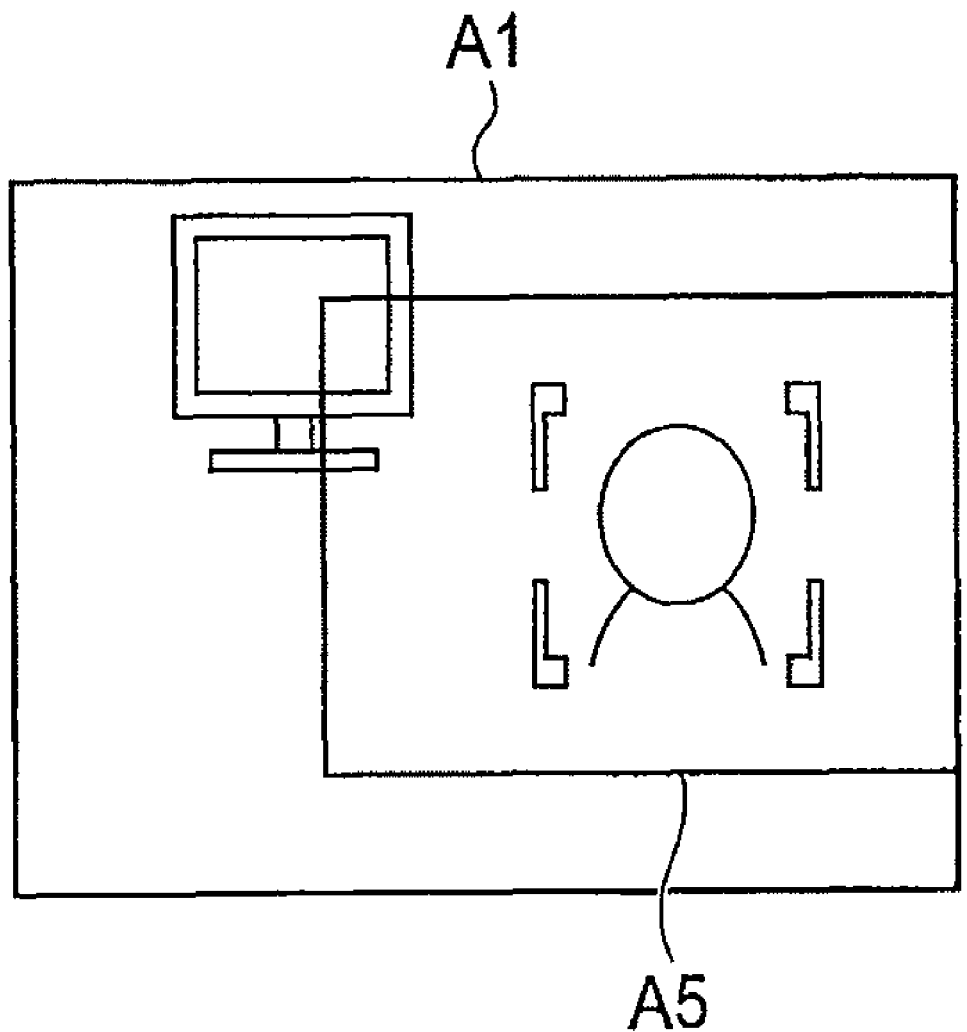
FIG. 7 illustrates an example of the CAF area corresponding to a frame rate that eliminates the effect caused by flickering.

As described above, in the present embodiment the frame rate is reduced and correspondingly the CAF area is extended when the capture of an image is affected by flickering. In particular, it is quite effective when the period of the vertical synchronizing signals VD (or a frame period) corresponds to the flicker period or its multiples. FIG. 7 illustrates the situation where the period of the vertical synchronizing signals VD is adjusted to match the flicker period and an area A5 that is larger than the area A4 of FIG. 6 is set as the CAF area. Further, the relationship between oscillations in the brightness of the ambient light (such as its flickering), the vertical synchronizing signals VD and the timing of the rolling shutter is shown in a timing chart of FIG. 8(b), where the abscissa is the axis of time.

Next, with reference to a flowchart of FIG. 9, the high-speed CAF operation of the present embodiment, which is carried out mainly by the controller 21, will be explained.

Figure 9:
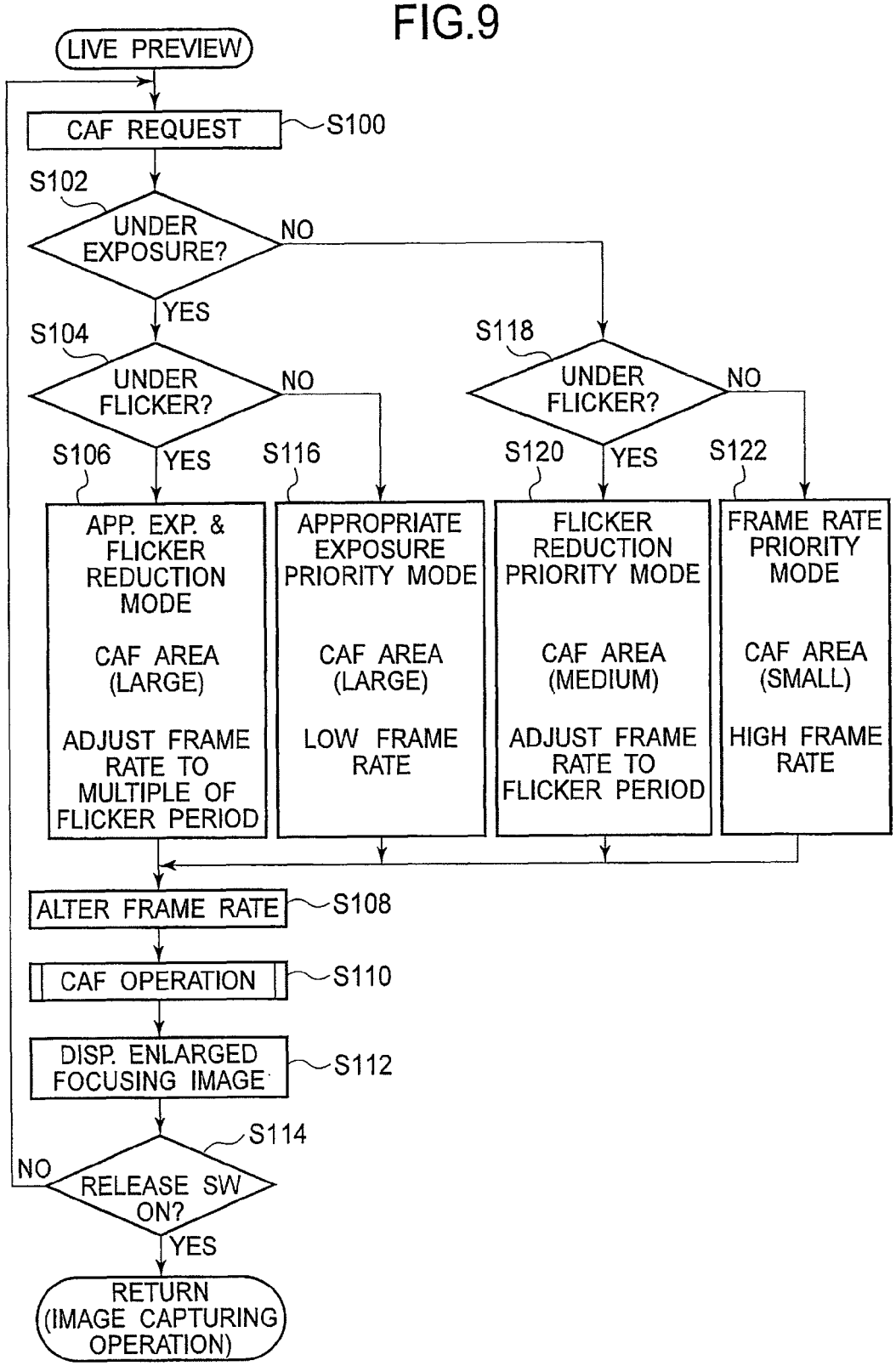
FIG. 9 is a flowchart of the CAF operation of the present embodiment.

The operations indicated in FIG. 9 are carried out when a through image is being displayed on the monitor 17 (see FIG. 1). When an AF (CAF) request is detected at Step S100, the high-speed CAF operation of the present embodiment is initiated. For example, whether an AF request has been made under continuous AF mode is determined in Step S100.

In Step S102, the exposure within the CAF area is evaluated to determine whether or not the brightness within the CAF area, as defined by the default frame rate, is underexposed (dark). For example, the total luminance within the CAF area is calculated from the pixel values within the area to determine whether or not its average is below a predetermined value. When the CAF area is determined to be underexposed (inappropriate), whether or not the present lighting condition includes cyclic flickering is determined in Step S104. Flickering may be detected by using a photo sensor, referring to a plurality of frame images, or by a user manually selecting a mode that is appropriate for flickering ambient light.

When it is determined in Step S104 that the ambient light is flickering, the period of the vertical synchronizing signal VD is adjusted to a frame rate that coincides with the flicker period in Step S106, and whether or not an appropriate exposure can be made in an exposure time (the maximum exposure time) available under the above frame rate is also determined. When an appropriate exposure is not available, the period of the vertical synchronizing signals VD is altered to a multiple of the flicker period and, in turn, the frame rate is reduced to a fraction of the multiple. Therefore, in this situation the frame rate is relatively low and the CAF area is relatively large. Note that the multiple may be incrementally increased by an order of one, and whether the exposure for each multiple is sufficient is determined by referring to the brightness of the CAF area, which is read out by the frame rate at the time.

On the other hand, when it is determined in Step S104 that the present lighting conditions do not include flickering, a frame rate that will result in an appropriate exposure is set in Step S116. In this situation, the frame rate is relatively low (corresponds to FIG. 5(b)) and the CAF area is relatively small (corresponds to the area A3 of FIG. 4).

Further, when it is determined in Step S102 that the luminance within the CAF area is bright, whether or not the ambient light includes flickering is determined in Step S118, as well as in Step S104. When it is determined that the lighting includes flickering, the frame rate is adjusted to match the period of flicker in Step S120. Namely, the period of the vertical synchronizing signals VD is adjusted to the flicker period. In this situation, the relative frame rate is a medium rate that is neither high nor low (corresponds to FIG. 5(b)) and the relative size of the CAF area is a medium size (corresponds to the area A3 of FIG. 4).

Further, when it is determined in Step 118 that the ambient lighting does not include flickering, a relatively high frame rate is set for a high-speed CAF in Step S122. In this situation, the relative size of the CAF area is small. Note that in Step S116 or Step S122, the frame rate may be selected from preset values, or it may also be calculated from the luminance within the area obtained in Step S102.

In Step S108, the frame rate of the CMOS image sensor 14 is revised to the value determined in either of Steps S106, S116, S120 or S122. Further, in Step S110 pixel signals within the corresponding CAF area are read out with the frame rate that has been selected in Step S108, and the CAF operation is carried out accordingly. Namely, a CAF operation, well known in the art, is carried out in cooperation with the AF controller 19 by comparing the contrast between images captured successively within the CAF area (see FIG. 1).

When the CAF operation of Step S110 is completed, a focusing image within the CAF area is enlarged and displayed on the monitor 17 (see FIG. 1) in Step S112. In Step S114, whether the release switch has been turned on is then determined. When the release switch is turned on, this CAF operation is terminated and the normal image capturing operation starts. On the other hand, when the release switch has not been turned on, the process returns to Step S100 and stands by until a CAF request is detected.

As described above, according to the present embodiment a high-speed contrast-detect autofocus operation is available with a focusing image always being captured under the appropriate exposure, and thereby a focusing image with high visibility is obtained.

Although the present embodiment has been described for a single-lens reflex camera, the present invention is not restricted to a digital camera and may also applied to a device, including a cell phone and the like, which is provided with a digital camera.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2010-200990 (filed on Sep. 8, 2010), which is expressly incorporated herein, by reference, in its entirety.

The invention claimed is:

1. An imaging system, comprising:
   a frame rate setter that sets a frame rate used in a focusing operation, said frame rate being set faster than a normal frame rate;
   an exposure evaluator that evaluates the exposure of a focusing image based on pixel signals read out from a focusing image area at said frame rate,
   said frame rate being reduced when said exposure is evaluated as an underexposure and said focusing operation being carried out at a reduced frame rate; and
   a flicker detector that detects flickering in ambient light, and when flickering is detected said frame rate is adjusted to a flicker period of the ambient light,
   wherein said focusing operation is carried out by adjusting said frame rate to a multiple of said flicker period when said exposure under a frame rate adjusted to said flicker period is evaluated as an underexposure.

2. The imaging system according to claim 1, further comprising a monitor that displays said focusing image obtained in said focusing operation.

3. The imaging system according to claim 1, wherein said imaging system comprises a digital camera.

4. A pixel signal readout method, comprising:
   setting a frame rate used in a focusing operation, said frame rate being set faster than a normal frame rate;
   evaluating an exposure of a focusing image based on pixel signals read out from a focusing image area at said frame rate;
   said frame rate being reduced when said exposure is evaluated as an underexposure and said pixel signals being read out at a reduced frame rate;
   detecting flickering in ambient light and adjusting said frame to a flicker period of the ambient light when flickering is detected; and
   carrying out said focusing operation by adjusting said frame rate to a multiple of said flicker period when said exposure under a frame rate adjusted to said flicker period is evaluated as an underexposure.

* * * * *